US012380823B2

(12) United States Patent
He

(10) Patent No.: US 12,380,823 B2
(45) Date of Patent: Aug. 5, 2025

(54) LIGHT SENSING UNIFORMITY COMPENSATION METHOD, METHOD FOR GENERATING LIGHT SENSING UNIFORMITY COMPENSATION TABLE, AND DISPLAY DEVICE

(71) Applicant: TCL CHINA STAR OPTOELECTRONICS TECHNOLOGY CO., LTD., Guangdong (CN)

(72) Inventor: Guanxian He, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 67 days.

(21) Appl. No.: 17/823,600

(22) Filed: Aug. 31, 2022

(65) Prior Publication Data

US 2024/0021125 A1 Jan. 18, 2024

(30) Foreign Application Priority Data

Jul. 12, 2022 (CN) ......................... 202210822333.7

(51) Int. Cl.
*G09G 3/20* (2006.01)

(52) U.S. Cl.
CPC ....... *G09G 3/20* (2013.01); *G09G 2320/0233* (2013.01); *G09G 2320/0626* (2013.01); *G09G 2360/141* (2013.01); *G09G 2360/16* (2013.01)

(58) Field of Classification Search
None
See application file for complete search history.

(56) References Cited

U.S. PATENT DOCUMENTS

2006/0284895 A1* 12/2006 Marcu ...................... G09G 3/20 345/690
2014/0300937 A1* 10/2014 Choe .................... G09G 3/3225 358/480
2019/0066574 A1* 2/2019 Wang ....................... G09G 3/20
2023/0075213 A1* 3/2023 Chen .................... G09G 3/2074
2023/0196985 A1* 6/2023 Kim ......................... G09G 3/32 345/55
2023/0281758 A1* 9/2023 Rotscholl ............... H04N 25/11 382/264
2023/0300284 A1* 9/2023 Ma ....................... G06V 10/761 348/254

* cited by examiner

*Primary Examiner* — Benjamin C Lee
*Assistant Examiner* — Emily J Frank

(57) ABSTRACT

Provided are a light sensing uniformity compensation method, a method for generating a light sensing uniformity compensation table, and a display device. According to each light sensing acquired value, a position of a light sensing module corresponding to each light sensing acquired value, and a relationship between the reference compensation values and the positions of the light sensing modules, a light sensing compensation value corresponding to each to-be-compensated light sense acquired value is determined, to correspondingly compensate for the to-be-compensated light sense acquired value. The plurality of compensated light sensing acquired values are output.

10 Claims, 9 Drawing Sheets

LIGHT SENSING UNIFORMITY COMPENSATION METHOD, METHOD FOR GENERATING LIGHT SENSING UNIFORMITY COMPENSATION TABLE, AND DISPLAY DEVICE

CROSS-REFERENCE TO RELATED APPLICATION

This application is based on and claims priority under 35 U.S.C. § 119 to China Patent Application No. 202210822333.7, filed on Jul. 12, 2022, in the China National Intellectual Property Administration, the disclosure of which is incorporated by reference herein in its entirety.

TECHNICAL FIELD

The inventive concept relates to a field of display technology, and more particularly, to a light sensing uniformity compensation method, a method for generating a light sensing uniformity compensation table, and a display device.

BACKGROUND

By integrating a pixel-level light sensing module inside a display panel, the display panel may be used for pixel-level in-screen light sensing recognition with high-density and high-precision. However, due to the influence of process conditions, the pixel-level light sensing module in the display panel lacks uniformity, therefore a phenomenon of vertical stripes and/or block stripes may occur in acquired light sensing data, and the acquired light sensing data may be not uniform.

SUMMARY

An embodiment in the present disclosure provides a light sense uniformity compensation method for compensating for a light sensing uniformity of a display panel, wherein the display panel comprises a plurality of light sensing modules, and the light sensing uniformity compensation method comprises the following steps: receiving light sensing acquired values having a number corresponding to a number of the plurality of light sensing modules, and determining positions of the light sensing modules respectively corresponding to the plurality of light sensing acquired values; determining two temporary compensation values corresponding to each of to-be-compensated light sensing acquired values of the light sensing acquired values according to each of the light sensing acquired values, the position of a corresponding one of the light sensing modules corresponding to each of the light sensing acquired values, and relationships between reference compensation values and the positions of the light sensing modules; and determining a light sensing compensation value corresponding to each of the to-be-compensated light sensing acquired values according to the two temporary compensation values corresponding to each of the to-be-compensated light sensing acquired values, to compensate for a corresponding to-be-compensated light sensing acquired value of the to-be-compensated light sensing acquired values, and outputting a plurality of compensated light sensing acquired values.

An embodiment in the present disclosure provides a method for generating a light sensing uniformity compensation table comprising: repeatedly acquiring a plurality of initial light sensing acquired values of a plurality of light sensing modules of a display panel at each of a plurality of reference light intensities; fusing at least one of the initial light sensing acquired values corresponding to a position of each of the light sensing modules, to obtain a plurality of light sensing fused acquired values; calculating a difference value between each of the light sensing fused acquired values and a corresponding light sensing expected value, to obtain a reference compensation value; and generating a compensation table according to the reference compensation value and the position of the light sensing module, wherein the compensation table comprises a relationship between the reference compensation value and the position of the light sensing module, the relationship between the reference compensation value and the position of the light sensing module correspond to a plurality of binding point planes, and each of the binding point planes corresponds to a corresponding reference light intensity.

An embodiment in the present disclosure provides a display device comprising: a display panel comprising a plurality of light sensing modules configured to generate a plurality of light sensing acquired values; and a drive mode comprising a storage module and a control module, wherein the storage module is configured to store a relationship between a reference compensation value and a position of the light sensing module, the control module is electrically connected to the plurality of light sensing modules and the storage module, the control module is configured to receive the plurality of light sensing acquired values, compensate for the plurality of light sensing acquired values according to each of the light sensing acquired values, the position of a corresponding one of the light sensing modules corresponding to each of the light sensing acquired values, and relationships between the reference compensation value and the position of the light sensing module, and output a plurality of compensated light sensing acquired values as light sensing signals to the display panel.

An embodiment in the present disclosure provides a method for compensating a light sensing uniformity, a method for generating a light sensing uniformity compensation table, and a display device. According to each of light sensing acquired values, a position of a corresponding one of light sensing modules corresponding to each of the light sensing acquired values, and relationships between reference compensation values and the positions of the light sensing modules, a light sensing compensation value corresponding to each of to-be-compensated light sensing acquired values is determined, to compensate for a corresponding to-be-compensated light sensing acquired value of the to-be-compensated light sensing acquired values. A plurality of compensated light sensing acquired values are output.

BRIEF DESCRIPTION OF THE DRAWINGS

In order that technical solutions in embodiments of the present disclosure may be more clearly described, reference will be made briefly below to the accompanying drawings required for the description of the embodiments. It will be apparent that the accompanying drawings in the description below are merely some of the embodiments of the present disclosure, and other drawings may be made to those skilled in the art without any creative work from these accompanying drawings.

DESCRIPTION OF SPECIFIC EMBODIMENTS OF THE INVENTION

Technical solutions in embodiments of the present disclosure will be clearly and completely described below in conjunction with accompanying drawings in the embodiments of the present disclosure. It will be apparent that the embodiments described below are merely part of, but not all of, the embodiments of the present disclosure. All other embodiments obtained by those skilled in the art without creative work, based on the embodiments of the present disclosure, fall within the protection scope of the present disclosure. In addition, it is understood that specific implementations described herein are merely intended to illustrate and explain the present disclosure and are not used to limit the present disclosure. In the present disclosure, unless otherwise stated, directional words used such as "upper" and "lower" generally refer to upper and lower directions of the device in actual use or working state, and specifically refer to drawing directions in the accompanying drawings. "inner" and "outer" are provided with respect to the outline of the device.

Figure 1:
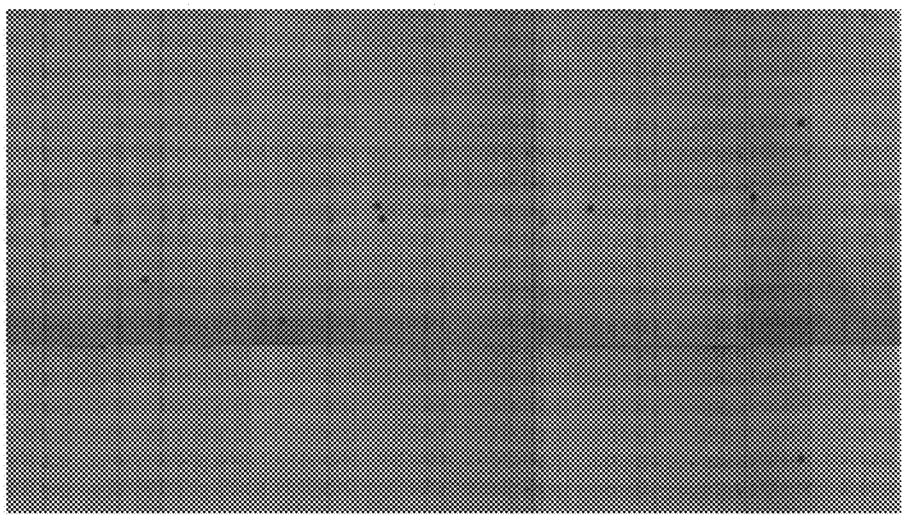
FIG. 1 (Prior Art)
FIG. 1 is a schematic view of uncompensated light sensing acquired data in the related art.

Specifically, FIG. 1 is a schematic view of uncompensated light sensing acquired data in the related art. The light sensing modules integrated in the display panel have different degrees of uniformity, because the process conditions thereof are not ideal in production. When the display panel is irradiated with a uniform light source having a light intensity of 50%, it can be seen from the analysis of the acquired data obtained from the light sensing modules that the light sensing modules in the display panel have a problem of light sensing non-uniformity (for example, a problem of vertical stripes and block stripes, and a problem of some defective spots (or be referred as bad spot or bad point) in a serious case).

The present disclosure provides a compensation method for the light sensing uniformity of a display panel for improving the light sensing uniformity of the display panel, in order to improve the non-uniformity of the acquired light sensing data due to the lack of uniformity in the light sensing modules in the display panel.

Figure 2:
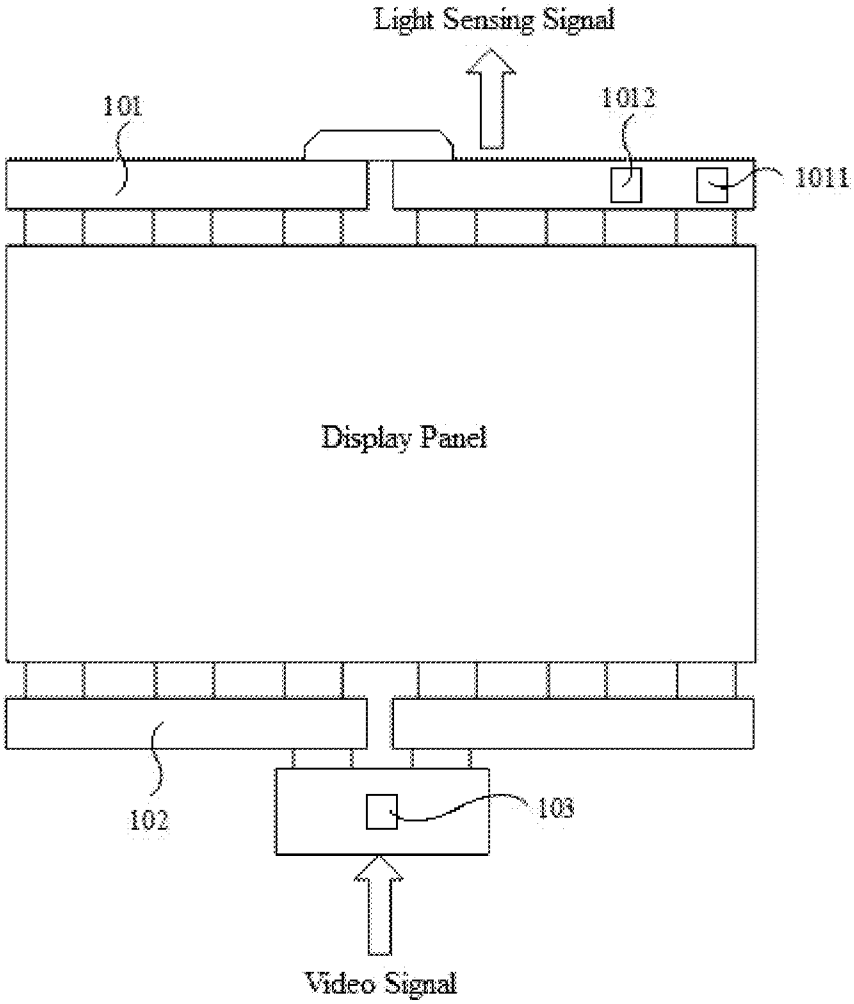
FIG. 2 is a structural schematic view of a display device according to an embodiment of the present disclosure.

Specifically, FIG. 2 is a structural schematic view of a display device according to an embodiment of the present disclosure. The display device includes a display panel and a driving module. The display panel includes a plurality of light sensing modules configured to generate a plurality of light sensing acquired values. The display panel is electrically connected to a driving module configured to supply a driving signal to the display panel.

Alternatively, the drive module includes a storage module 1011 and a control module 1012. The light sensing module includes an opto-sensor. It will be appreciated that the light sensing module may also be a module having a light sensing function and formed by combining a plurality of devices.

The storage module 1011 is configured to store relationships between reference compensation values and positions of the light sensing modules. The control module 1012 is electrically connected to the plurality of light sensing modules and the storage module 1011. The control module 1012 is configured to receive the plurality of light sensing acquired values, compensate for the plurality of light sensing acquired values according to each of the light sensing acquired values, the position of a corresponding one of the light sensing modules corresponding to each of the light sensing acquired values, and relationships between the reference compensation values and the positions of the light sensing modules, and output the plurality of compensated light sensing acquired values as light sensing signals to the display panel.

Alternatively, the display panel is electrically connected to a light sensing acquired circuit 101 and a display driving circuit 102. Alternatively, the light sensing acquired circuit 101 and the display driving circuit 102 are located on opposite sides of the display panel, respectively. The display driving circuit 102 is configured to drive and display data lines, and the light sensing acquired circuit 101 is configured to acquire light sensing data lines. Alternatively, the storage module 1011 and the control module 1012 may be integrated with the light sensing acquired circuit 101.

Alternatively, the driving module further includes a timing controller 103 configured to control a display timing and a scanning timing, and synchronously transmit the scanning start signal to the control module 1012.

Alternatively, the control module 1012 is further configured to determine whether the position of the light sensing module corresponding to each of the light sensing acquired values coincides with a position of the defective spot(s) before the compensation for the plurality of light sensing acquired values. Under the condition that the position of the light sensing module corresponding to the light sensing acquired value is determined to coincide with the position of the defective spot, the light sensing acquired value corresponding to the position of the defective spot and the light sensing acquired values corresponding to more than one of light sensing modules adjacent to the position of the defective spot are convolved by a convolution operator using the position of the defective spot as an anchor point of a convolution kernel, to obtain a light sensing convoluted value as the light sensing acquired value of the light sensing module corresponding to the position of the defective spot.

Alternatively, the control module 1012 is further configured to: drive the plurality of light sensing acquired circuits 101 according to a scanning line timing from the timing controller 103, to read the light sensing acquired values of a current scanning line; picture-rearrange (for example, rearrange in accordance with the positions of the light sensing modules) the plurality of light sensing acquired values transmitted by the plurality of light sensing acquired circuits 101, to collect and arrange the plurality of light sensing acquired values into an acquired data matrix corresponding to all of the light sensing modules in the whole display panel; and transmitting the light sensing signal to an application system. Alternatively, the application system includes various systems such as a television, a mobile phone, a tablet, a display, or the like.

It will be appreciated that the display device includes a movable display device (such as a notebook computer, a mobile phone, or the like), a fixed terminal (such as a desktop computer, a television, or the like), a commercial display device, a measuring device (such as a sports wristband, a thermometer, or the like), or the like.

Figure 3:
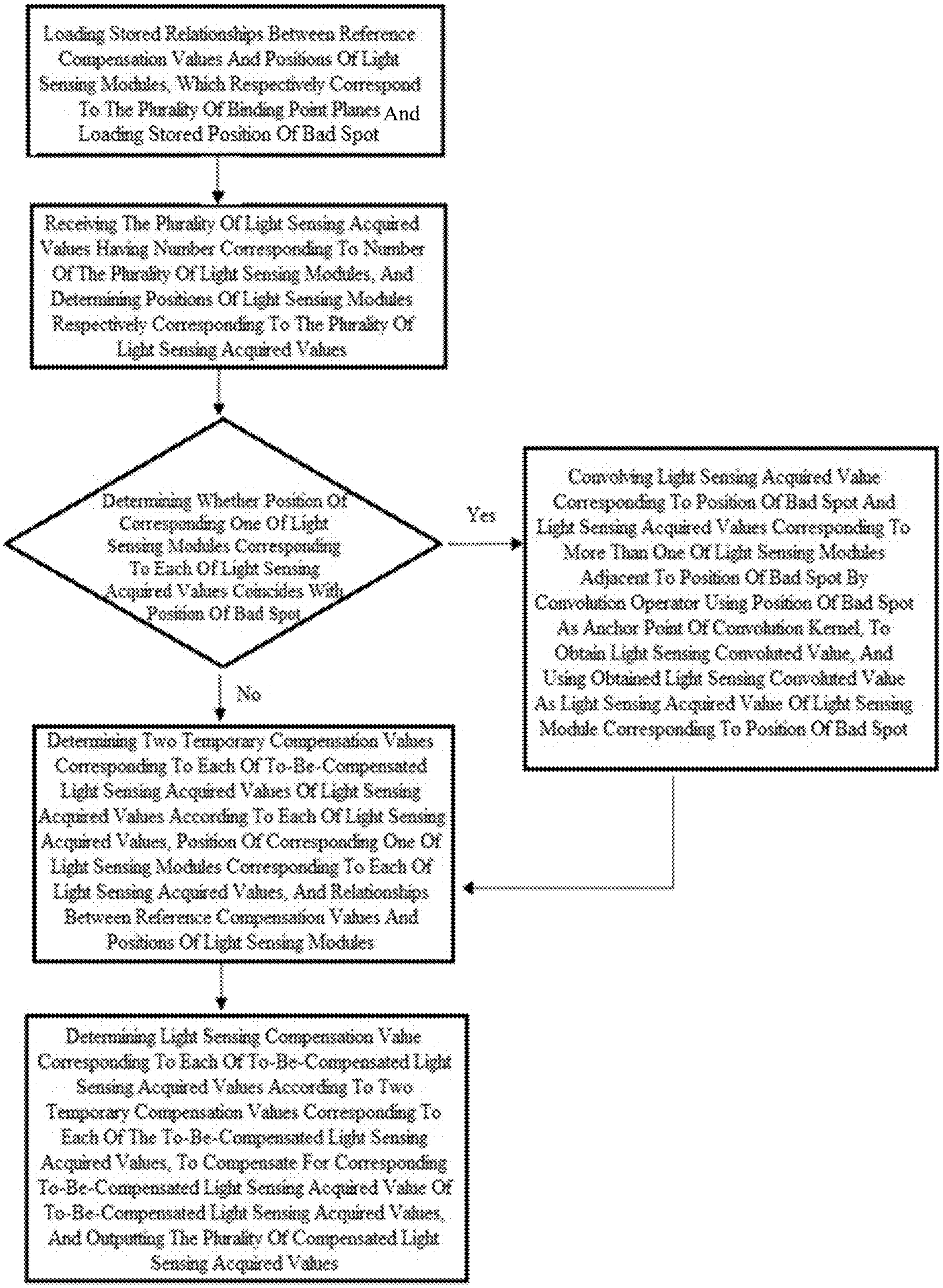
FIG. 3 is a flowchart of a compensation method for light sensing uniformity according to an embodiment of the present disclosure.

FIG. 3 is a flowchart of a compensation method for the light sensing uniformity according to an embodiment of the present disclosure. The compensation method for the light sensing uniformity includes the steps of:

- receiving the plurality of light sensing acquired values having a number corresponding to (e.g., equal to, or same as) a number of the plurality of light sensing modules, and determining positions of the light sensing modules respectively corresponding to the plurality of light sensing acquired values;
- determining two temporary compensation values corresponding to each of to-be-compensated light sensing acquired values of the light sensing acquired values according to each of the light sensing acquired values, the position of a corresponding one of the light sensing modules corresponding to each of the light sensing acquired values, and the relationships between the reference compensation values and the positions of the light sensing modules; and
- determining a light sensing compensation value corresponding to each of the to-be-compensated light sensing acquired values according to the two temporary compensation values corresponding to each of the to-be-compensated light sensing acquired values, to compensate for a corresponding to-be-compensated light sensing acquired value of the to-be-compensated light sensing acquired values, and outputting the plurality of compensated light sensing acquired values.

Alternatively, the compensation method for the light sensing uniformity may be performed by the control module 1012. That is, the control module 1012 receives the plurality of light sensing acquired values having the number corresponding to the number of the plurality of light sensing modules; determine, for each light sensing acquired value, a coordinate position of the light sensing module corresponding thereto in the light sensing module array according to an input sequence of the plurality of light sensing acquired values; determining two temporary compensation values corresponding to each of the to-be-compensated light sensing acquired values according to each of the light sensing acquired values, the position of a corresponding one of the light sensing modules corresponding to each of the light sensing acquired values, and the relationships between the reference compensation values and the positions of the light sensing modules, to obtain the light sensing compensation value according to the two temporary compensation values, thereby compensating for the to-be-compensated light sensing acquired value; and outputting the plurality of compensated light sensing acquired values to the application system.

The step of receiving light sensing acquired values having the number corresponding to the number of the plurality of light sensing modules, and determining positions of the light sensing modules respectively corresponding to the plurality of light sensing acquired values is performed. The reason is that: the light sensing acquired values acquired by the plurality of light sensing acquired circuits 101 are inputted to the control module 1012 at the same time, and thus the plurality of light sensing acquired values need to be buffered and then read out in a certain sequence, to ensure that the read light sensing acquired data may correspond to the positions of the light sensing modules in the display panel. For example, in the case of four light sensing acquired circuits 101, only 320 columns of light sensing modules are provided in the display panel. Therefore, the light sensing acquired values corresponding to 192 channels are invalid values, and the invalid values cannot truly reflect the light sensing characteristics of the display panel, so it is necessary to remove them.

Still referring to FIG. 3, in order to determine the two temporary compensation values corresponding to each of the to-be-compensated light sensing acquired values, the relationships between the reference compensation values and the positions of the light sensing modules needs to be determined in advance. Therefore, before the step of determining the two temporary compensation values corresponding to each of the to-be-compensated light sensing acquired values of the light sensing acquired values according to each of the light sensing acquired values, the position of the light sensing module corresponding to each of the light sensing acquired values, and the relationships between the reference compensation values and the positions of the light sensing modules, the method further includes:

- loading stored relationships between the reference compensation values and the positions of the light sensing modules, which respectively correspond to the plurality of binding point planes.

Wherein the relationships, respectively corresponding to the plurality of binding point planes, between the reference compensation values and the positions of the light sensing modules is obtained by calculating difference values between initial light sensing acquired values and corresponding light sensing expected values at a plurality of reference light intensities. Each of the binding point planes corresponds to one of the reference light intensities. The two temporary compensation values are respectively located at positions, in the two binding point planes, corresponding to the light sensing module corresponding to the to-be-compensated light sensing acquired value. That is, the two temporary compensation values are respectively located in the two binding point planes, and a position at which each of the temporary compensation values are located corresponds to the position of the light sensing module corresponding to the to-be-compensated light sensing acquired value. Therefore, the two corresponding temporary compensation values may be acquired in the two binding point planes according to the position of the light sensing module corresponding to the to-be-compensated light sensing acquired value.

Alternatively, upon startup of the control module 1012, the relationships between the reference compensation values and the positions of the light sensing modules, which correspond to the plurality of binding point planes and stored in the storage module 1011, may be loaded into an on-chip volatile buffer of the control module 1012.

It will be appreciated that before the step of receiving the light sensing acquired values having the number corresponding to the number of the plurality of light sensing modules, and determining the positions of the light sensing modules respectively corresponding to the plurality of light sensing acquired values, loading the stored relationships between the reference compensation values and the positions of the light sensing modules, which respectively correspond to the plurality of binding point planes.

Alternatively, the plurality of reference light intensities are set as 100% full-scale, 90% full-scale, 85% full-scale, 80% full-scale, 70% full-scale, 60% full-scale, 55% full-scale, 50% full-scale, 45% full-scale, 40% full-scale, 30% full-scale, 25% full-scale, 20% full-scale, 10% full-scale, and 0% full-scale, of the light sensing module, respectively. Further, the plurality of reference light intensities are set as 100% full-scale, 50% full-scale, and 0% full-scale of the light sensing module, respectively. The term "full-scale" means the full-scale of an illumination intensity of the light sensing module, a max lux number of the light sensing module, or the full-scale of sensed light intensity of the light sensing module.

Alternatively, by taking the reference light intensity set as 100% full-scale of the light sensing module as an example, the step of calculating the difference values between the initial light sensing acquired values and the corresponding light sensing expected values at the reference light intensities to obtain the reference compensation value includes: setting light intensity of a stable and uniform light source with controllable light intensity in 100% full-scale of the light sensing module; repeatedly acquiring the plurality of initial light sensing acquired values of each of the plurality of light sensing modules of the display panel; fusing more than one of the initial light sensing acquired values corresponding to a position of each light sensing module to obtain a light sensing fused acquired value corresponding to a position of each light sensing module; grouping the plurality of light sensing fused acquired values to obtain a plurality of light sensing fused acquired sets, wherein each light sensing fused acquired set includes at least one light sensing fused acquired value; and calculating a light sense fused average value of each light sense fused acquired set, and replacing the light sensing fused acquired values included in the light sensing fused acquired set with the light sense fused average value. Finally, a difference value between each light sensing fused acquired value and the corresponding light sensing expected value is calculated, to obtain the plurality of reference compensation values, so that a compensation table corresponding to the reference light intensity set as 100% full-scale of the light sensing module is generated based on the plurality of reference compensation values and the positions of the light sensing modules. Calculating, in turn, the difference values between the initial light sensing acquired values and the corresponding light sensing expected values under the reference light intensities set as 50% full-scale and 0% full-scale of the light sensing module, to obtain compensation tables corresponding to the reference light intensities set as 50% full-scale and 0% full-scale of the light sensing module. The light intensity corresponding to each compensation table may be referred to as the binding point plane.

It will be appreciated that the compensation table may be generated by a dot mode. That is, when the light sensing fused acquired set includes one light sensing fused acquired value, the light sensing fused average value of the light sensing fused acquired set is equal to the light sensing fused acquired value. Therefore, the difference value between the light sensing fused acquired value and the light sensing expected value may be directly calculated, to obtain the reference compensation value. For every light sensing fused acquired value in turn, the difference value between the light sensing fused acquired value and the corresponding light sensing expected value is calculated, to obtain the plurality of reference compensation values. The compensation table corresponding to the reference light intensity set as 100% full-scale of the light sensing module is generated based on the plurality of reference compensation values and the positions of the light sensing modules.

In addition, the compensation table may be generated by a block mode. That is, when the light sensing fused acquired set includes a plurality of light sensing fused acquired value, the light sensing fused average value of the light sensing fused acquired set is equal to a weighted average value of the plurality of light sensing fused acquired values included in the light sensing fused acquired set. After replacing the light sensing fused acquired values included in the light sensing fused acquired set with the light sensing fused average value, the difference value between each light sensing fused average value and the corresponding light sensing expected value is calculated, to obtain the plurality of reference compensation values. The compensation table corresponding to the reference light intensity set as 100% full-scale of the light sensing module is generated based on the plurality of reference compensation values and the positions of the light sensing modules.

Figure 4:
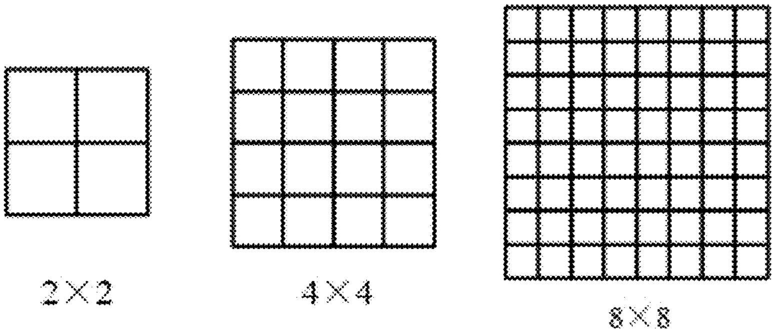
FIG. 4 is a schematic view of grouping a plurality of light sensing acquired values according to an embodiment of the present disclosure.

Alternatively, FIG. 4 is a schematic view of grouping the plurality of light sensing acquired values according to an embodiment of the present disclosure. The plurality of light sensing fused acquired values may be grouped in sizes of 2×2, 4×4, 8×8, or the like. Data calculation amount may be effectively reduced by the compensation table generated using the block mode. The cost of the storage module 1011 may be controlled by selecting a larger block area for a light sensing module array of a high resolution.

Alternatively, each of the compensation tables describing a corresponding one of the relationships between the reference compensation values and the positions of the light sensing modules is stored in the storage module 1011.

The method for determining the two temporary compensation values corresponding to each to-be-compensated light sensing acquired value varies with the different compensation table generation modes.

Figure 5A:
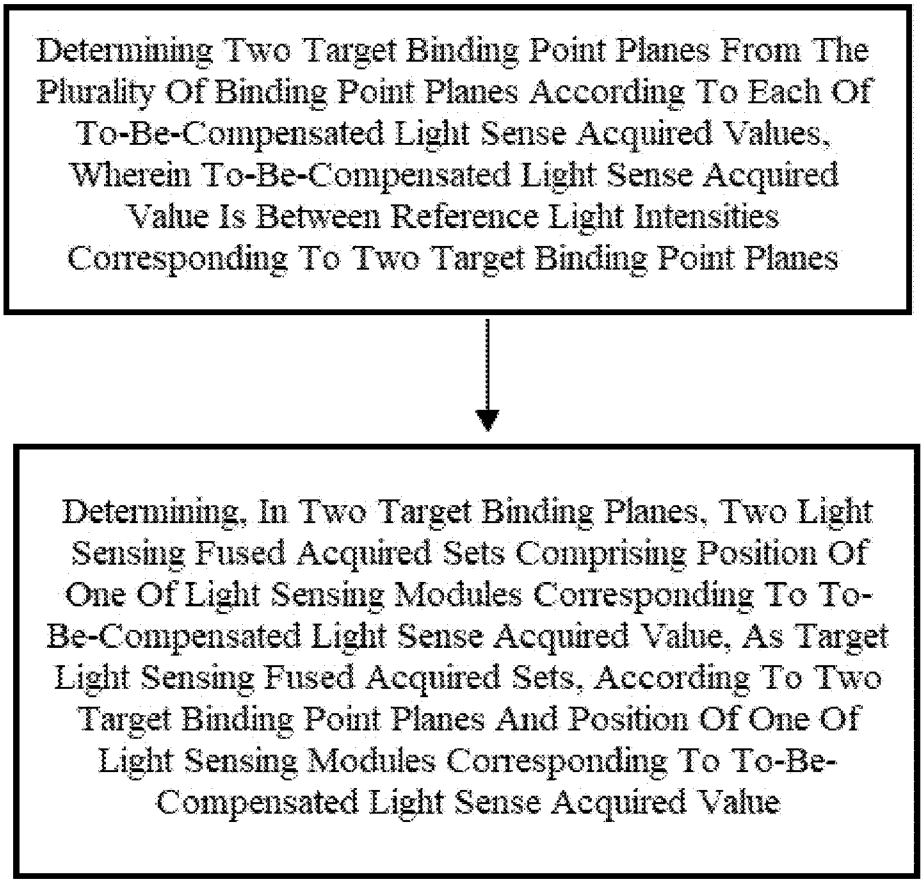
FIGS. 5A-5B are flowcharts for determining two temporary compensation values according to an embodiment of the present disclosure.
Figure 5B:
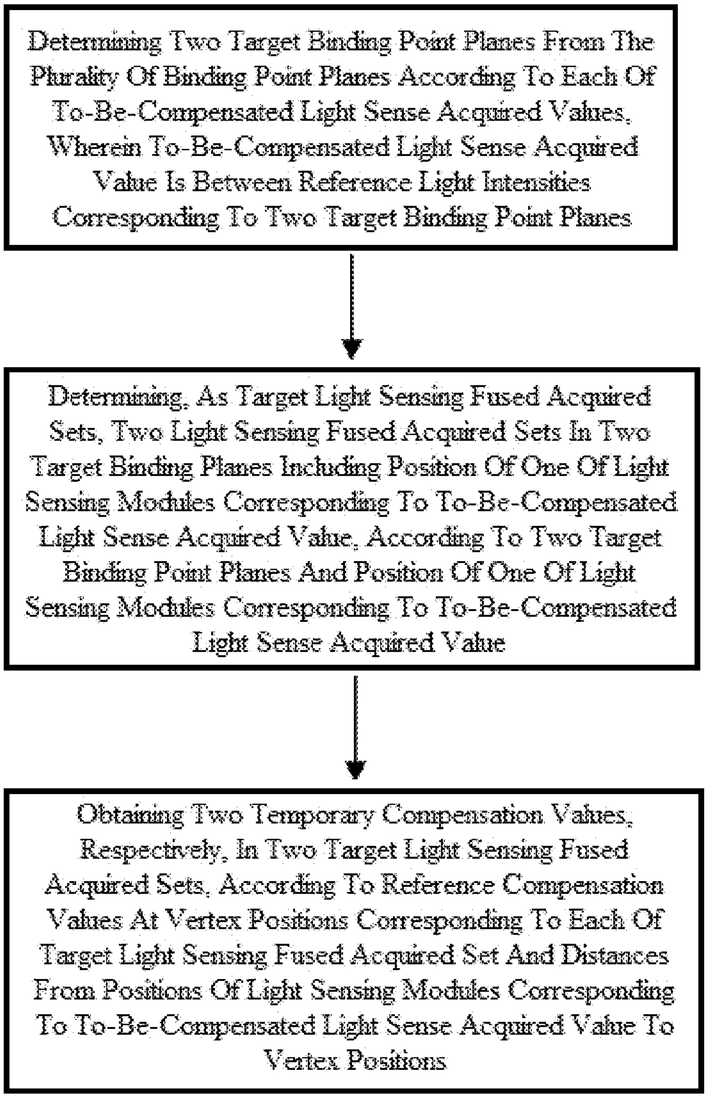

Specifically, FIGS. 5A-5B are flowcharts of methods for determining two temporary compensation values according to embodiments of the present disclosure. Still referring to FIG. 5A, in the case of the compensation table generated by the dot mode, the step of determining the two temporary compensation values corresponding to each of to-be-compensated light sensing acquired values of the light sensing acquired values according to each of the light sensing acquired values, the position of the light sensing module corresponding to each of the light sensing acquired values, and the relationships between the reference compensation values and the positions of the light sensing modules includes:

determining two target binding point planes from the plurality of binding point planes according to each of the to-be-compensated light sensing acquired values, wherein the to-be-compensated light sensing acquired value is between the reference light intensities corresponding to the two target binding point planes; and determining, as the two temporary compensation values, two reference compensation values in the two target binding point planes corresponding to the position of one of the light sensing modules corresponding to the to-be-compensated light sensing acquired value, according to the two target binding point planes and the position of one of the light sensing modules corresponding to the to-be-compensated light sensing acquired value.

Still referring to FIG. 5B, in the case of the compensation table generated by the block mode, the step of determining the two temporary compensation values corresponding to each of the to-be-compensated light sensing acquired values of the light sensing acquired values according to each of the light sensing acquired values, the position of the light sensing module corresponding to each of the light sensing acquired values, and the relationships between the reference compensation values and the positions of the light sensing modules includes:

determining two target binding point planes from the plurality of binding point planes according to each of the to-be-compensated light sensing acquired values, wherein the to-be-compensated light sensing acquired value is between the reference light intensities corresponding to the two target binding point planes;

determining, in the two target binding point planes, two light sensing fused acquired sets including the position of one of the light sensing modules corresponding to the to-be-compensated light sensing acquired value, as target light sensing fused acquired sets, according to the two target binding point planes and the position of one of the light sensing modules corresponding to the to-be-compensated light sensing acquired value; and obtaining the two temporary compensation values, respectively, in the two target light sensing fused acquired sets, according to reference compensation values at vertex positions corresponding to each of the target light sensing fused acquired set and distances from the positions of the light sensing modules corresponding to the to-be-compensated light sensing acquired value to the vertex positions.

Figure 6:
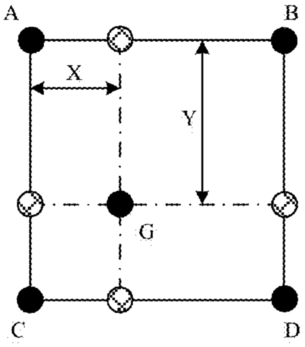
FIG. 6 is a schematic view of a step of calculating two temporary compensation values by using a target light sensing fused acquired set according to an embodiment of the present disclosure.

Specifically, FIG. 6 is a schematic view of a step of calculating the two temporary compensation values by using the target light sensing fused acquired set according to an embodiment of the present disclosure. In the case of the compensation table generated by the block mode, to obtain the temporary compensation values, two sets of vertices may be determined in the two target light sense fused acquired sets, respectively. Then the two temporary compensation values are obtained according to the reference compensation values corresponding to the two sets of vertices and the distances from the positions of the light sensing modules corresponding to the to-be-compensated light sensing acquired value to the vertex position. For example, a set of vertices determined by a target light sensing fused acquired set includes vertices A, B, C, and D. The reference compensation values at the vertices A, B, C, and D are determined. A temporary compensation value G is calculated by bilinear interpolation according to the reference compensation values at the vertices A, B, C, and D and distances X and Y from the position to the vertices A, B, C, and D.

Alternatively, the light sensing compensation value is obtained by linear interpolating the two temporary compensation values. By summing each of the light sensing compensation values with a corresponding one of the light sensing acquired values, the to-be-compensated light sensing acquired value is compensated. Alternatively, for example, the reference light intensities corresponding to the target binding point planes are a1 and b1, respectively. The temporary compensation value determined by the target binding point plane corresponding to the reference light intensity a1 is a2. The temporary compensation value determined by the target binding point plane corresponding to the reference light intensity b1 is b2. The to-be-compensated light sensing acquired value is c1. c1 is between a1 and b1. The light sensing compensation value $c2=[(c1-a1)(b2-a2)/(b1-a1)]+a2$ corresponding to the to-be-compensated light sensing acquired value c1.

Alternatively, not every light sensing acquired value of the plurality of light sensing acquired values needs to be compensated. For example, in the case that the light sensing acquired value corresponding to the position of one of the light sensing module is equal to the reference compensation value of the binding point plane corresponding to the position, the light sensing acquired value is a light sensing acquired value that does not need to be compensated.

Figure 7:
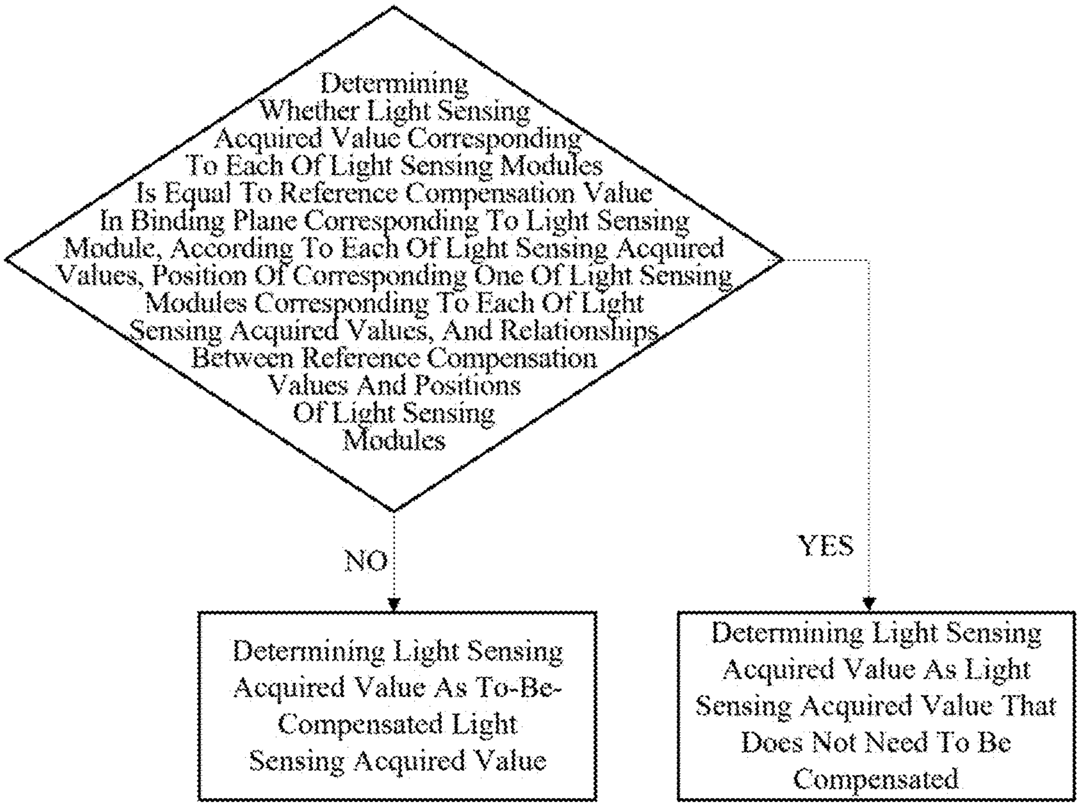
FIG. 7 is a flowchart of a step of determining the to-be-compensated light sensing acquired value according to an embodiment of the present disclosure.

FIG. 7 is a flowchart of a step of determining the to-be-compensated light sensing acquired value according to an embodiment of the present disclosure. In order to determine the to-be-compensated light sensing acquired value, the step of determining two temporary compensation values corresponding to each of the to-be-compensated light sensing acquired values of the light sensing acquired values according to each of the light sensing acquired values, the position of a corresponding one of the light sensing modules corresponding to each of the light sensing acquired values, and the relationships between the reference compensation values and the positions of the light sensing modules, the method further includes:

determining whether the light sensing acquired value corresponding to each of the light sensing modules is equal to the reference compensation value in the binding point plane corresponding to the light sensing module, according to each of the light sensing acquired values, the position of a corresponding one of the light sensing modules corresponding to each of the light sensing acquired values, and the relationships between the reference compensation values and the positions of the light sensing modules; and under the condition that the light sensing acquired value is different from the reference compensation value in the binding point plane corresponding to the position of the light sensing module, determining the light sensing acquired value as the to-be-compensated light sensing acquired value.

Still referring to FIG. 3, some of the plurality of light sensing modules in the display panel cannot perform the sensing function. That is, there is a defective spot. If there is a defective spot, it is necessary to eliminate the influence of the defective spot, so that the light sensing uniformity compensation method has a good compensation effect on the light sense uniformity of the display panel. Therefore, before the step of determining two temporary compensation values corresponding to each of the to-be-compensated light sensing acquired values of the light sensing acquired values according to each of the light sensing acquired values, the position of a corresponding one of the light sensing modules corresponding to each of the light sensing acquired values, and the relationships between the reference compensation values and the positions of the light sensing modules, the method further includes:

determining whether the position of a corresponding one of the light sensing modules corresponding to each of the light sensing acquired values coincides with the position of the defective spot; and under the condition that the position of the light sensing module corresponding to each of the light sensing acquired values coincides with the position of the defective spot, convolving the light sensing acquired value corresponding to the position of the defective spot and the light sensing acquired values corresponding to more than one of light sensing modules adjacent to the position of the defective spot by a convolution operator using the position of the defective spot as the anchor point of the convolution kernel, to obtain a light sensing convoluted value, and using the obtained light sensing convoluted value as the light sensing acquired value of the light sensing module corresponding to the position of the defective spot.

Figure 8:
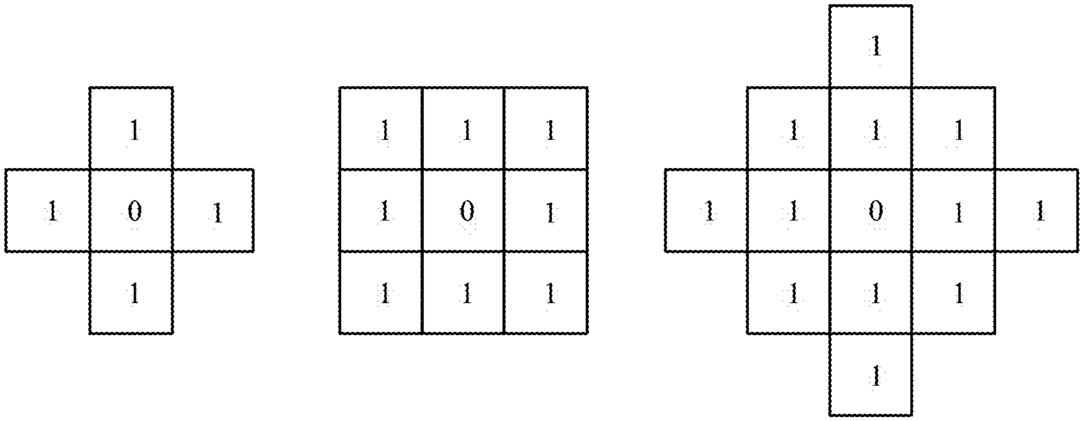
FIG. 8 is a schematic view of convolution of a position of a defective spot according to an embodiment of the present disclosure.

FIG. 8 is a schematic view of convolution of the position of the defective spot according to an embodiment of the present disclosure. Assuming that the position of the light sensing module corresponding to the current light sensing acquired value coincides with the position of the defective spot, the light sensing module corresponding to the position of the defective spot (that is, the light sensing module labeled 0 in FIG. 8) is used as the anchor point (that is, a center point) of the convolution kernel, and a remaining part of the convolution kernel is corresponding to the light sensing modules labeled 1 in FIG. 8 (that is, the light sensing modules labeled 1 is the light sensing modules adjacent to the position of the defective spot). Coefficients in the convolution kernel and the light sensing acquired values corresponding to the light sensing modules labeled 0 and 1 in FIG. 8 are multiplied and summed, to obtain the light sensing convoluted value. The light sensing convoluted value is assigned to the light sensing module corresponding to the position of the defective spot (that is, the light sensing module labeled 0 in FIG. 8) as a light sensing acquired value of the light sensing module corresponding to the position of the defective spot. That is, the light sensing acquired value of the light sensing module corresponding to the position of the defective spot is a weighted average value of the light sensing acquired values corresponding to the light sensing modules adjacent to the position of the defective spot.

Still referring to FIG. 3, in order to determine whether the position of the light sensing module corresponding to the light sensing acquired value coincides with the position of the defective spot, it is necessary to determine the position information of the defective spot in advance. Therefore, before the step of determining whether the position of the corresponding one of the light sensing module corresponding to each of the light sensing acquired values coincides with the position of the defective spot before the compensation for the plurality of light sensing acquired values, the method further includes:

loading a stored position of the defective spot.

The position of the defective spot is determined by determining difference between the initial light sensing acquired values and the light sensing expected values at the reference light intensity. If a deviation between one of the initial light sensing acquired values and a corresponding one of the light sensing expected values of the light sensing module exceeds a set threshold value, the position of the light sensing module corresponding to this initial light sensing acquired value is the position of the defective spot.

Alternatively, upon the startup of the control module 1012, the relationships between the reference compensation values and the positions of the light sensing modules and the defective spot position information stored in the storage module 1011 may be loaded into the on-chip volatile buffer of the control module 1012, wherein the relationships between the reference compensation values and the positions of the light sensing modules respectively correspond to the plurality of binding point planes and are stored in the storage module 1011.

Figure 9A:
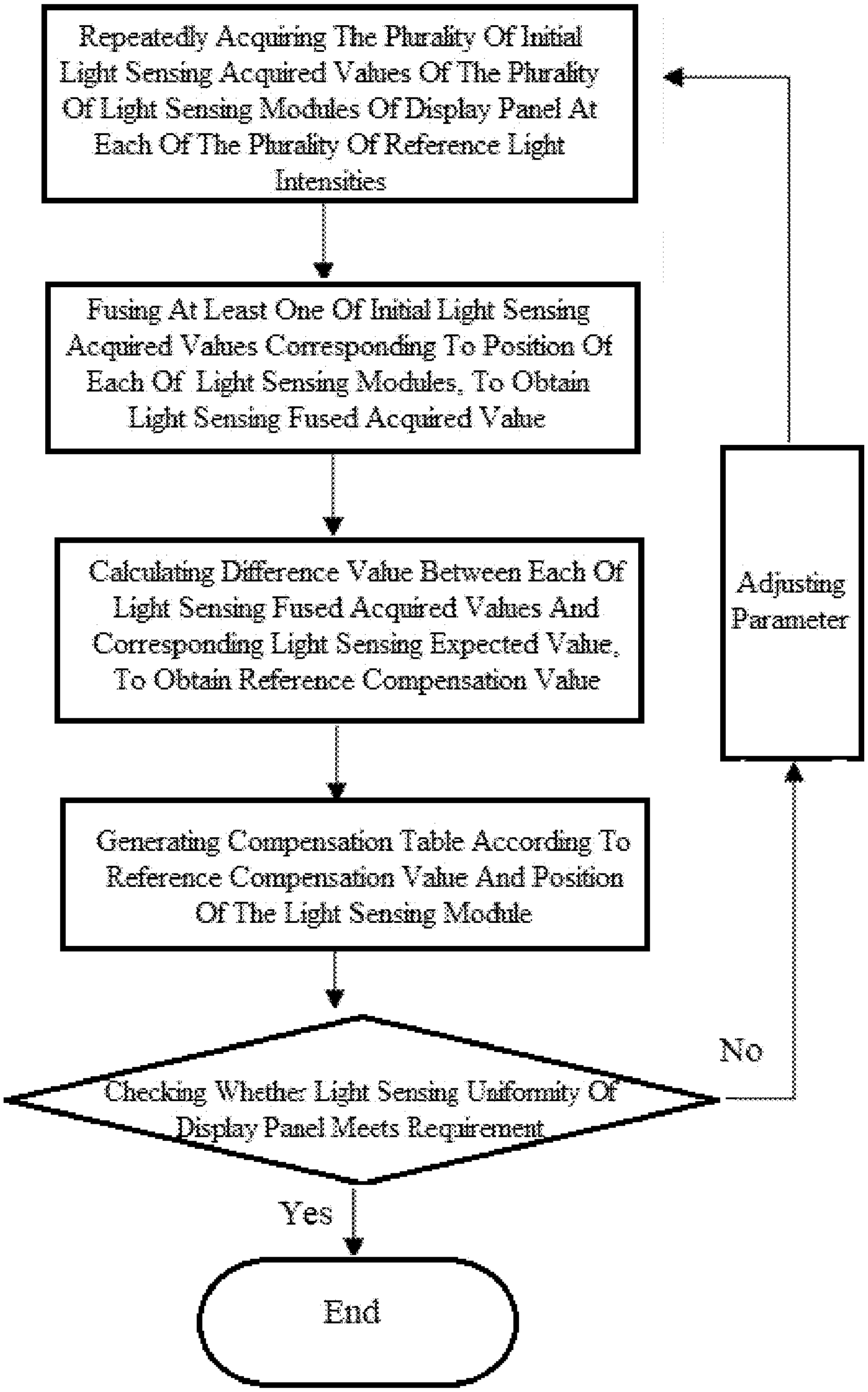
FIGS. 9A-9B are flowcharts of methods for generating light sense uniformity compensation tables according to embodiments of the present disclosure.
Figure 9B:
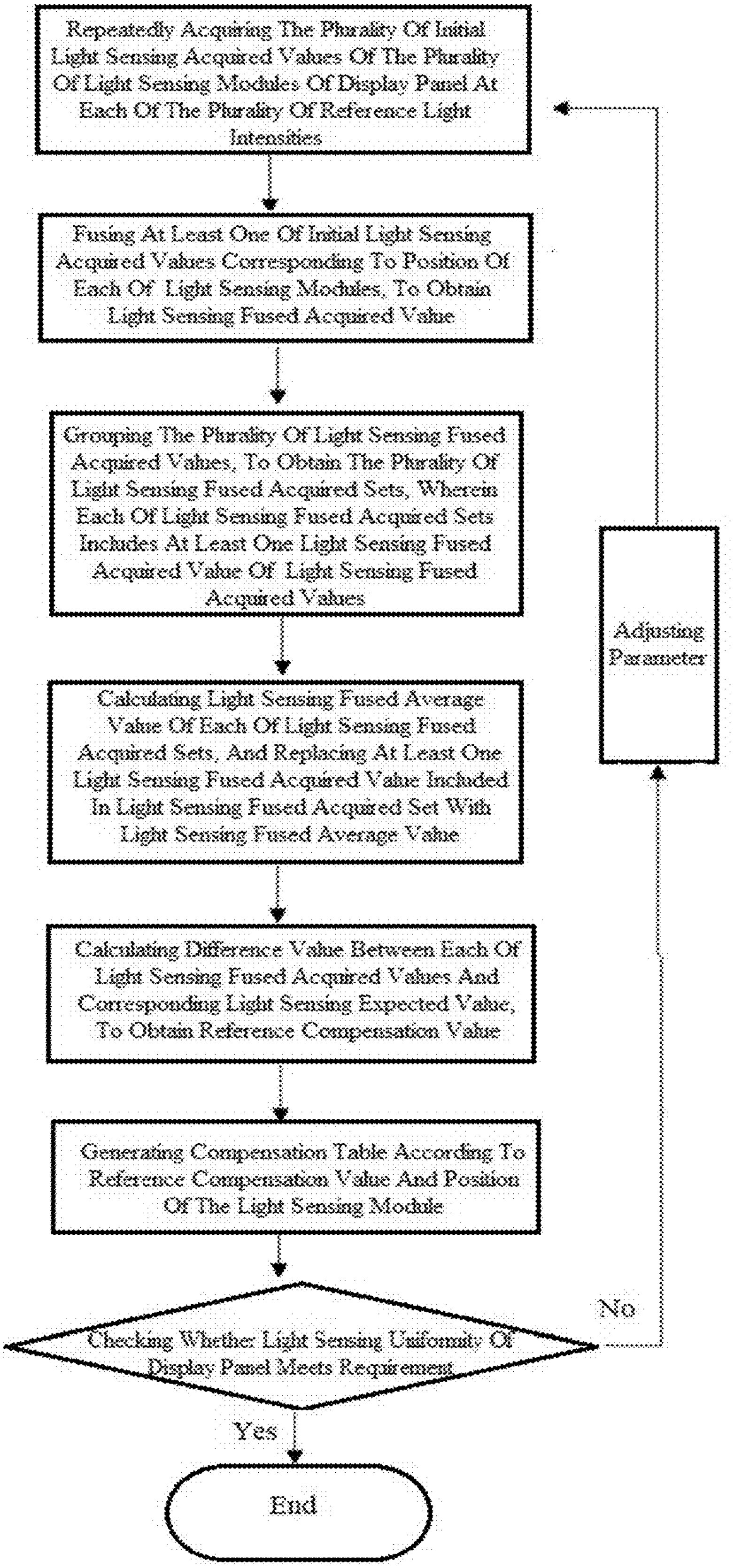

FIGS. 9A-9B are flowcharts of a method for generating a light sensing uniformity compensation table according to an embodiment of the present disclosure. The present disclosure further provides a method for generating a light sensing uniformity compensation table, including:

repeatedly acquiring the plurality of initial light sensing acquired values of the plurality of light sensing modules of the display panel at each of the plurality of reference light intensities;

fusing at least one of the initial light sensing acquired values corresponding to the position of each of the light sensing modules, to obtain a light sensing fused acquired value;

calculating the difference value between each of the light sensing fused acquired values and the corresponding light sensing expected value, to obtain the reference compensation value; and generating a compensation table according to the reference compensation value and the position of the light sensing module.

The compensation table includes a relationship between the reference compensation value and the position of the light sensing module. The relationships between the reference compensation values and the positions of the light sensing modules respectively correspond to the plurality of binding point planes. Each of the binding point planes corresponds to a corresponding reference light intensity.

Alternatively, the plurality of reference light intensities are set as 100% full-scale, 90% full-scale, 85% full-scale, 80% full-scale, 70% full-scale, 60% full-scale, 55% full-scale, 50% full-scale, 45% full-scale, 40% full-scale, 30% full-scale, 25% full-scale, 20% full-scale, 10% full-scale, and 0% full-scale, of the light sensing module, respectively. It will be appreciated that for the same light sensing module, the light sensing acquired value generated at different light intensities has different degrees of deviation. The relationship curve line with respect to the deviation and the light intensity may be better fitted based on more than one of the binding point planes. However, considering the actual test efficiency, the plurality of reference light intensities may be set as 100%, 50%, and 0% of the light sensing module.

Alternatively, at each of the plurality of reference light intensities, the number of times the initial light sensing acquired values of the plurality of light sensing modules of the display panel are repeatedly acquired may be greater than or equal to three times. For example, before the compensation step, the light source intensity is set as 100% full-scale of the light sensing module. The initial light sensing acquired values of each of the plurality of light sensing modules of the display panel are repeatedly acquired three times. Fusing the light sensing acquired values repeatedly acquired three times according to the position of the light sensing module, so that only one light sensing fused acquired value corresponds to each light sensing module after the three light sensing acquired values corresponding to each light sensing module are fused. The difference value between each of the light sensing fused acquired values and the corresponding light sensing expected value is calculated, to obtain the reference compensation values. A compensation table corresponding to a reference light intensity set as 100% full-scale of the light sensing module is generated according to the reference compensation values and the positions of the light sensing modules. Thereafter, the reference light intensity is changed in sequence. The step of generating a light sense uniformity compensation table is repeatedly performed to obtain a plurality of compensation tables. The light intensity corresponding to each compensation table is referred to as a binding point plane, so as to mark a size within a range of the light sensing module.

The difference value between each of the light sensing fused acquired values and the corresponding light sensing expected value is calculated, by a compensation table generated using the point mode (i.e., corresponding to the flowchart shown in FIG. 9A), or by a compensation table generated using the block mode (i.e., corresponding to the flowchart shown in FIG. 9B).

In the case that the compensation table is generated using the point mode, the difference value between each light sensing fused acquired value and the corresponding light sensing expected value may be directly calculated, to obtain the plurality of reference compensation values. The compensation tables corresponding to different reference light intensities of the light sensing module are generated according to the plurality of reference compensation values and the positions of the light sensing modules.

In the case that the compensation table is generated using the block mode, the plurality of light sensing fused acquired values may be grouped. The light sensing fused acquired value included in the light sensing fused acquired set is replaced with a light sensing fused average value (that is, after the light sensing fused acquired values included in the light sensing fused acquired set are replaced with the light sensing fused average value, the light sensing fused acquired value included in the light sensing fused acquired set is the light sensing fused average value). The plurality of reference compensation values are obtained by calculating the difference values between each light sensing fused average value and the light sensing expected value. The compensation tables corresponding to different reference light intensities are generated according to the plurality of reference compensation values and the positions of the light sensing modules. Specifically, referring to FIG. 9B, before the step of calculating the difference value between each of the light sensing fused acquired values and the corresponding light sensing expected value, to obtain the reference compensation value, the method further includes:

- grouping the plurality of light sensing fused acquired values, to obtain the plurality of light sensing fused acquired sets, wherein each of the light sensing fused acquired sets includes at least one light sensing fused acquired value of the light sensing fused acquired values; and
- calculating a light sensing fused average value of each of the light sensing fused acquired sets, and replacing the at least one light sensing fused acquired value included in the light sensing fused acquired set with the light sensing fused average value.

Alternatively, the plurality of light sensing fused acquired values may be grouped in sizes of 2×2, 4×4, 8×8, or the like. The data calculation amount may be effectively reduced by the compensation table generated using the block mode. The cost of the storage module may be controlled by selecting a larger block area for a light sensing module array of a high resolution.

Alternatively, the light sensing fused average value of each of the light sensing fused acquired sets is equal to a weighted average value of the at least one light sensing fused acquired value included in each of the light sensing fused acquired sets.

Figure 10:
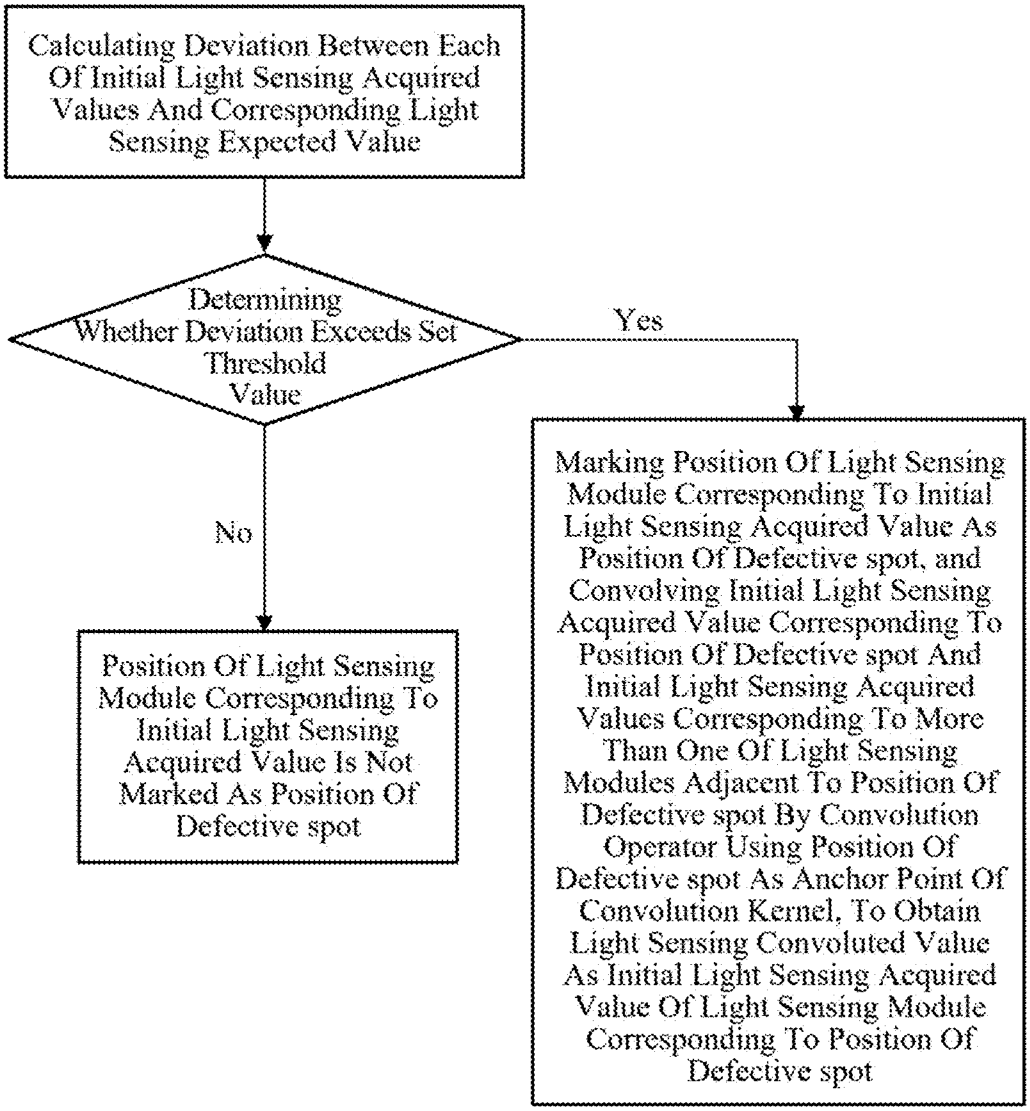
FIG. 10 is a flowchart of determining a position of a defective spot according to an embodiment of the present disclosure.

FIG. 10 is a flowchart of determining the position of the defective spot according to an embodiment of the present disclosure. Before the step of fusing the plurality of the initial light sensing acquired values corresponding to the position of each of the light sensing modules, to obtain a light sensing fused acquired value, the method further includes:

- calculating a deviation between each of the initial light sensing acquired values and the corresponding light sensing expected value, and determining whether the deviation exceeds a set threshold value; and
- under the condition that the deviation exceeds the set threshold value, marking the position of the light sensing module corresponding to the initial light sensing acquired value as the position of the defective spot, and convolving the initial light sensing acquired value corresponding to the position of the defective spot and the initial light sensing acquired values corresponding to more than one of the light sensing modules adjacent to the position of the defective spot by the convolution operator using the position of the defective spot as the anchor point of the convolution kernel, to obtain a light sensing convoluted value as the initial light sensing acquired value of the light sensing module corresponding to the position of the defective spot.

Under the condition that the deviation does not exceed the set threshold value, the position of the light sensing module corresponding to the initial light sensing acquired value is not marked as the position of the defective spot position.

Alternatively, the set threshold may be set according to actual requirements. For example, assuming that the reference light intensity is set as 100% full-scale of the light sensing module, 100% full-scale is the light sensing expected value. The set threshold may be set in a range of 0%-50%. Alternatively, the set threshold may be set as 0%, 5%, 10%, 0%, 15%, 20%, 30%, 35%, 40%, 45%, or 50%.

The process of convolving the initial light sensing acquired value corresponding to the position of the defective spot and the initial light sensing acquired values corresponding to more than one of the light sensing modules adjacent to the position of the defective spot by the convolution operator is similar to the calculation process shown in FIG. 8, and details are not described herein. Alternatively, the convolution operator may in a type of detection operator of salt and pepper noise.

Alternatively, the difference values between the initial light sensing acquired values and the light sensing expected values at the plurality of reference light intensities may be calculated by an external processor module. The external processor module is also configured to determine the difference values between the initial light sensing acquired values and the light sensing expected values at the reference light intensities.

Alternatively, after the step of generating the compensation table according to the reference compensation value and the position of the light sensing module, the method further includes:

- checking whether the light sensing uniformity of the display panel meets a requirement; and Under the condition that the light sensing uniformity does not meet the requirement, the step of generating the light sensing uniformity compensation table is performed again by adjusting a parameter (the parameter involved in the adjustment includes the reference light intensity, a number of the light sensing fused acquired values included in the light sensing fused acquired set, the set threshold value, the weights for the average calculation, or the like), to correct the obtained reference compensation value. Under the condition that the light sensing uniformity of the display panel meets the requirement, the process is ended.

In the step of checking whether the light sensing uniformity of the display panel meets a requirement, it is possible to check whether the light sensing uniformity of the display panel meets the requirement or not, by calculating a variance of the plurality of light sensing acquired values (or light sensing acquired values of only part of key positions, such as center points in an upper left region, an upper right region, a lower left region, a lower right region, a middle region, etc.) and a target value to be achieved.

Alternatively, the external processor module is further configured to: check whether the light sensing uniformity of the display panel meets the requirement; Under the condition that the light sensing uniformity does not meet the requirement, the step of generating the light sensing uniformity compensation table is performed again by adjusting the parameter (the parameter involved in the adjustment includes the reference light intensity, the number of the light sensing fused acquired values included in the light sensing fused acquired set, the set threshold value, the weights for the average calculation, or the like), to correct the obtained reference compensation value. Under the condition that the light sensing uniformity of the display panel meets the requirement, the process is ended.

Alternatively, the external processor module includes a device (such as a computer) of a light sensing value processing and calculation.

Alternatively, the method for generating the light sense uniformity compensation table may be performed by the control module.

It will be appreciated that the relationships between the reference compensation values and the positions of the light sensing modules, generated by the method for generating the light sense uniformity compensation table, may be stored in the storage module of the display device before delivery of the display device. After the delivery of the display device, the relationship between the stored reference compensation value and the position of the light sensing module may be directly recalled, to compensate for the light sensing uniformity of the display panel.

The present disclosure further provides a light sensing uniformity compensation system for compensating for the light sensing uniformity of the display panel according to any one of the light sensing uniformity compensation methods described above. The light sensing uniformity compensation system includes a controllable light source and an external processor module. The controllable light source is configured to provide a reference light intensity, to illuminate the display panel. The external processor module is configured to generate the relationship between the reference compensation values and the positions of the light sensing modules, and store the relationship between the reference compensation values and the positions of the light sensing modules to the storage module, so that the control module compensates for the light sensing acquired values corresponding to the plurality of light sensing modules included in the display panels according to the relationship between the reference compensation values and the positions of the light sensing modules. The storage module and the control module are electrically connected to the display panel.

Figure 11:
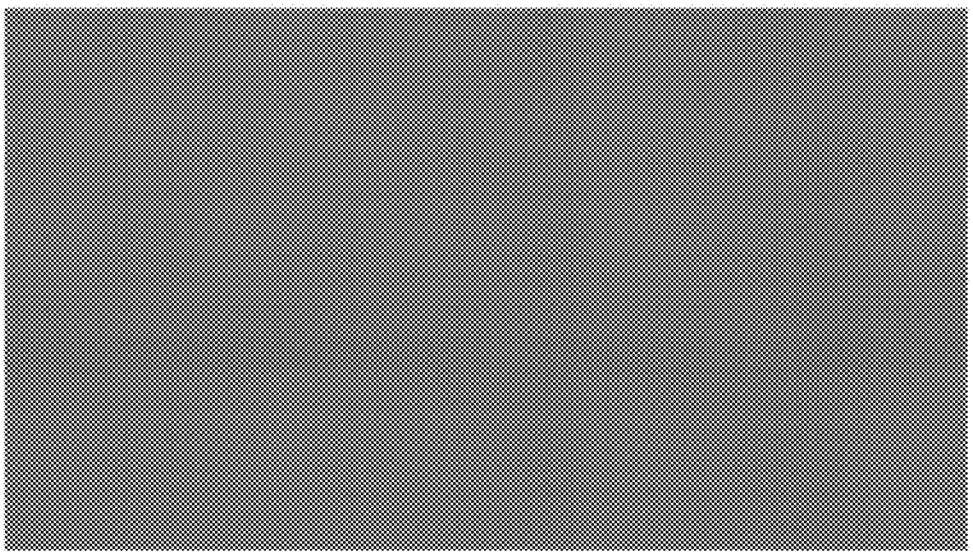
FIG. 11 is a schematic view of compensated light sensing acquired data according to an embodiment of the present disclosure.

FIG. 11 is a schematic view of compensated light sensing acquired data according to an embodiment of the present disclosure. In the case that the display panel is illuminated with a uniform light source having a light intensity set as 50% full-scale, by the analysis of the light sensing data obtained via the light sensing uniformity compensation, the vertical stripes and/or block stripes may be greatly improved, and the defective spot is removed. Therefore, a method for compensating a light sensing uniformity, a method for generating a light sensing uniformity compensation table, and a display device provided in the present disclosure may improve the non-uniformity of the acquired light sensing data due to the lack of uniformity in the light sensing modules in the display panel, and the light sensing function of the display panel can be improved.

The principles and embodiment of the present disclosure have been set forth with reference to specific examples. The description of the above embodiment is merely intended to assist in understanding the method of the present disclosure and its core idea. At the same time, variations in the detailed description and the application scope will occur to those skilled in the art in accordance with the teachings of the present disclosure. In light of the foregoing, the present specification is not to be construed as limiting the invention.

What is claimed is:

1. A light sense uniformity compensation method for compensating for a light sensing uniformity of a display panel, wherein the display panel comprises a plurality of light sensing modules arranged in an array in the display panel, and the light sensing uniformity compensation method comprises the following steps:

receiving a plurality of to-be-compensated light sensing acquired values having a number corresponding to a number of the plurality of light sensing modules, and determining a position of one of the light sensing modules in the array corresponding to each of the plurality of to-be-compensated light sensing acquired values;

loading pre-stored relationships between reference compensation values and each of the positions of the light sensing modules, which respectively correspond to a plurality of binding point planes;

determining two target binding point planes from the plurality of binding point planes according to each of the to-be-compensated light sensing acquired values, wherein the to-be-compensated light sensing acquired value is between the reference light intensities corresponding to the two target binding point planes; and determining, as the two temporary compensation values, two reference compensation values in the two target binding point planes corresponding to the position of the one of the light sensing modules, according to the two target binding point planes and the position of the one of the light sensing modules corresponding to each of the to-be-compensated light sensing acquired value; and determining a light sensing compensation value corresponding to each of the to-be-compensated light sensing acquired values according to the two temporary compensation values corresponding to each of the to-be-compensated light sensing acquired values, to compensate for a corresponding to-be-compensated light sensing acquired value of the to-be-compensated light sensing acquired values, and outputting a plurality of compensated light sensing acquired values, wherein the relationships between the reference compensation values and the positions of the light sensing modules, which respectively correspond to the plurality of binding point planes, are obtained by calculating a difference between an initial light sensing acquired value and a light sensing expected value both for each of the positions of the light sensing modules at each of a plurality of reference light intensities, each of the binding point planes corresponds to a corresponding one of the reference light intensities, and the two corresponding temporary compensation values are acquired in two ones of the binding point planes according to the position of the light sensing module corresponding to each of the to-be-compensated light sensing acquired values.

2. The light sense uniformity compensation method according to claim 1, wherein determining the two temporary compensation values corresponding to each of the to-be-compensated light sensing acquired values of the light sensing acquired values according to each of the light sensing acquired values, the position of the light sensing module corresponding to each of the light sensing acquired values, and the relationships between the reference compensation values and the positions of the light sensing modules, the light sense uniformity compensation method further comprises the following steps:

determining whether the position of a corresponding one of the light sensing modules corresponding to each of the light sensing acquired values coincides with a position of a defective spot; and under the condition that the position of the light sensing module corresponding to each of the light sensing acquired values coincides with the position of the defective spot, convolving the light sensing acquired value corresponding to the position of the defective spot and the light sensing acquired values corresponding to more than one of light sensing modules adjacent to the position of the defective spot by a convolution operator using the position of the defective spot as an anchor point of a convolution kernel, to obtain a light sensing convoluted value, and using the obtained light sensing convoluted value as the light sensing acquired value of the light sensing module corresponding to the position of the defective spot.

3. The light sense uniformity compensation method according to claim 2, wherein before the step of determining whether the position of a corresponding one of the light sensing modules corresponding to each of the light sensing acquired values coincides with the position of the defective spot, the light sense uniformity compensation method further comprises the following step:

loading the position, which has been stored, of the defective spot, wherein the position of the defective spot is determined by determining differences between the initial light sensing acquired values and the light sensing expected values at the reference light intensity.

4. The light sense uniformity compensation method according to claim 3, wherein the plurality of reference light intensities are set as a 100% full-scale, a 50% full-scale, and a 0% full-scale of the light sensing module, respectively.

5. The light sense uniformity compensation method according to claim 1, wherein before the step of determining the two temporary compensation values corresponding to each of the to-be-compensated light sensing acquired values of the light sensing acquired values according to each of the light sensing acquired values, the position of the light sensing module corresponding to each of the light sensing acquired values, and the relationships between the reference compensation values and the positions of the light sensing modules, the light sense uniformity compensation method further comprises the following steps:

determining whether the light sensing acquired value corresponding to each of the light sensing modules is equal to the reference compensation value in the binding point plane corresponding to the light sensing module, according to each of the light sensing acquired values, the position of a corresponding one of the light sensing modules corresponding to each of the light sensing acquired values, and the relationship between the reference compensation values and the positions of the light sensing modules; and under the condition that the light sensing acquired value is different from the reference compensation value in the binding point plane corresponding to the position of the light sensing module, determining the light sensing acquired value as the to-be-compensated light sensing acquired value.

6. The light sense uniformity compensation method according to claim 1, wherein the light sensing compensation value is obtained by linear interpolating the two temporary compensation values.

7. The light sense uniformity compensation method according to claim 1, wherein the determining of the position of one of the light sensing modules in the array corresponding to each of the plurality of to-be-compensated light sensing acquired values comprises:

determining, for each of the light sensing acquired values, the position of one of the light sensing modules in the array corresponding to each of the plurality of to-be-compensated light sensing acquired values according to a receiving sequence of the plurality of to-be-compensated light sensing acquired values.

8. A light sense uniformity compensation method for compensating for a light sensing uniformity of a display panel, wherein the display panel comprises a plurality of light sensing modules arranged in an array in the display panel, and the light sensing uniformity compensation method comprises the following steps:

receiving a plurality of to-be-compensated light sensing acquired values having a number corresponding to a number of the plurality of light sensing modules, and determining a position of one of the light sensing modules in the array corresponding to each of the plurality of to-be-compensated light sensing acquired values;

loading pre-stored relationships between reference compensation values and each of the positions of the light sensing modules, which respectively correspond to a plurality of binding point planes;

determining two target binding point planes from the plurality of binding point planes according to each of the to-be-compensated light sensing acquired values, wherein the to-be-compensated light sensing acquired value is between the reference light intensities corresponding to the two target binding point planes;

determining, in the two target binding point planes, two light sensing fused acquired sets comprising the position of the one of the light sensing modules corresponding to the to-be-compensated light sensing acquired value, as target light sensing fused acquired sets, according to the two target binding point planes and the position of the one of the light sensing modules corresponding to the to-be-compensated light sensing acquired value;

obtaining the two temporary compensation values, respectively, in the two target light sensing fused acquired sets, according to the reference compensation values at vertex positions and distances from the position of the one of the light sensing modules corresponding to the to-be-compensated light sensing acquired value to the vertex positions; and determining a light sensing compensation value corresponding to each of the to-be-compensated light sensing acquired values according to the two temporary compensation values corresponding to each of the to-be-compensated light sensing acquired values, to compensate for a corresponding to-be-compensated light sensing acquired value of the to-be-compensated light sensing acquired values, and outputting a plurality of compensated light sensing acquired values, wherein the relationships between the reference compensation values and the positions of the light sensing modules, which respectively correspond to the plurality of binding point planes, are obtained by calculating a difference between an initial light sensing acquired value and a light sensing expected value both for each of the positions of the light sensing modules at each of a plurality of reference light intensities, each of the binding point planes corresponds to a corresponding one of the reference light intensities, and the two corresponding temporary compensation values are acquired in two ones of the binding point planes according to the position of the light sensing module corresponding to each of the to-be-compensated light sensing acquired values.

9. A display device comprising:

a display panel comprising a plurality of light sensing modules arranged in an array in the display panel and configured to generate a plurality of to-be-compensated light sensing acquired values having a number corresponding to a number of the plurality of light sensing modules; and a drive mode comprising a storage module and a control module, wherein the storage module is configured to store relationships, which respectively correspond to a plurality of binding point planes between reference compensation values and each of positions of the light sensing modules, the control module is electrically connected to the plurality of light sensing modules and the storage module, the control module is configured to receive the plurality of light sensing acquired values, and determine a position of one of the light sensing modules in the array corresponding to each of the plurality of to-be-compensated light sensing acquired values; determine two target binding point planes from the plurality of binding point planes according to each of the to-be-compensated light sensing acquired values, wherein the to-be-compensated light sensing acquired value is between the reference light intensities corresponding to the two target binding point planes; and determine, as the two temporary compensation values, two reference compensation values in the two target binding point planes corresponding to the position of the one of the light sensing modules, according to the two target binding point planes and the position of the one of the light sensing modules corresponding to each of the to-be-compensated light sensing acquired value; determine a light sensing compensation value corresponding to each of the to-be-compensated light sensing acquired values according to the two temporary compensation values corresponding to each of the to-be-compensated light sensing acquired values, to compensate for a corresponding to-be-compensated light sensing acquired value of the to-be-compensated light sensing acquired values, and output a plurality of compensated light sensing acquired values as light sensing signals to the display panel, wherein the relationships between the reference compensation values and the positions of the light sensing modules, which respectively correspond to the plurality of binding point planes, are obtained by calculating a difference between an initial light sensing acquired value and a light sensing expected value both for each of the positions of the light sensing modules at each of a plurality of reference light intensities, each of the binding point planes corresponds to a corresponding one of the reference light intensities, and the two corresponding temporary compensation values are acquired in two ones of the binding point planes according to the position of the light sensing module corresponding to each of the to-be-compensated light sensing acquired values.

10. The method for generating a light sensing uniformity compensation table according to claim 9, wherein the control module is further configured to: before compensating the plurality of light sensing acquired values, determine whether the position of a corresponding one of the light sensing modules corresponding to each of the light sensing acquired values coincides with a position of a defective spot; and under the condition that the position of the light sensing module corresponding to each of the light sensing acquired values coincides with the position of the defective spot, convolve the light sensing acquired value corresponding to the position of the defective spot and the light sensing acquired values corresponding to more than one of light sensing modules adjacent to the position of the defective spot by a convolution operator using the position of the defective spot as an anchor point of a convolution kernel, to obtain a light sensing convoluted value as the light sensing acquired value of the light sensing module corresponding to the position of the defective spot.

* * * * *